United States Patent [19]

Blakeslee et al.

[11] Patent Number: 5,730,885
[45] Date of Patent: Mar. 24, 1998

[54] SCREEN PACKS FOR REDUCING GELS IN POLYPROPYLENE COPOLYMERS

[75] Inventors: Theodore Robert Blakeslee, deceased, late of Neshanic Station, by Rena L. Blakeslee, executrix; David Khanin, Piscataway; Richard H. Bozenbury, Jr., Plainfield, all of N.J.

[73] Assignee: Union Carbide Chemicals & Plastics Technology Corporation, Danbury, Conn.

[21] Appl. No.: 753,932

[22] Filed: Dec. 3, 1996

[51] Int. Cl.⁶ .................................................. B01D 37/00
[52] U.S. Cl. ..................... 210/773; 264/169; 264/211.43; 210/806
[58] Field of Search ....................... 210/773, 774, 210/767, 806; 264/169, 211.43

[56] References Cited

U.S. PATENT DOCUMENTS

| | | | |
|---|---|---|---|
| 1,818,549 | 8/1931 | Furman | 264/169 |
| 3,125,107 | 3/1964 | Wood | 264/169 |
| 3,154,610 | 10/1964 | Denyes | 264/169 |
| 3,215,760 | 11/1965 | Grace | 264/169 |
| 3,233,288 | 2/1966 | Straus | 264/169 |
| 4,175,147 | 11/1979 | Bollen | 264/169 |
| 4,316,867 | 2/1982 | Henry | 264/169 |
| 4,334,783 | 6/1982 | Suzaka | 366/69 |
| 4,661,249 | 4/1987 | Langley | 210/266 |
| 4,822,547 | 4/1989 | Derrick | 264/169 |
| 5,076,988 | 12/1991 | Rifi | 264/211.12 |
| 5,458,474 | 10/1995 | Neubauer et al. | 425/202 |

OTHER PUBLICATIONS

Manfred H. Pahl, *Filtration of Polymer Melt*, 1981, pp. 1–7.
Editor: Detlef Gneub, *Filtration of Plastics Melts Melts*, 1988, pp. 2, 14–15.
Product Bulletin, Anderson Wire Works, Inc. 1 PA CE (undated).

Primary Examiner—Ernest G. Therkorn
Attorney, Agent, or Firm—A.S. Reiskind

[57] ABSTRACT

The present invention teaches a method for reducing the number and size of polymeric gels in a polypropylene blend by filtering the blend through multiple filter screens during the extrusion of the blend.

14 Claims, No Drawings

SCREEN PACKS FOR REDUCING GELS IN POLYPROPYLENE COPOLYMERS

BACKGROUND OF THE INVENTION

Most polypropylene (PP) impact copolymers are blends of PP homopolymer molecules with ethylene-propylene copolymer molecules. The comonomer content of the ethylene-propylene copolymer molecules is usually such that these molecules are commonly referred to as ethylene-propylene rubber (EPR). The EPR molecules are incompatible with the PP homopolymer, so that the blend of the two is a two phase system. Such polymer blends are problematic in that if two types of polymers are not interdispered well, the physical properties of the resulting polymer blend will suffer. In the case of PP impact copolymers, poor dispersion of the EPR is evidenced by the presence of "gels" of rubber particles in the impact copolymer. It tends to be difficult to obtain good dispersion when using the types of PP homopolymer and EPR molecules that give an impact copolymer with good physical properties.

In the manufacture of PP impact copolymers, the extrusion system generally provides the process by which these polymer blends are mixed. Such extrusion systems generally consist of a mixing section, followed by a melt conveying section, a screen filter, an optional melt pump, and a pelletizer. The usual purpose of the mixing section is to mix and disperse the EPR into the homopolymer. The usual purpose of the screening section is melt filtration, to remove agglomerated stabilizers or inorganic impurities on a screen filter. In a continuous system, the system must be stopped to remove a filter blinded by these agglomerates and install a new filter because the blinded filter causes high pressure drops and a throughput reduction.

Additionally, it has been found that a significant percentage of the polymer blends are not mixed sufficiently as they are processed through the extrusion system because the polymer blend "bypasses" the high stress regions within the flow channels of the mixer. Thus, inadequate dispersive or distributive mixing of the polymers occurs in the mixing section.

Various screen filter designs to disperse some components in the mixing process and/or to remove impurities have been tried. It is thought that the use of the screens having fine mesh provides the best filtration, but there are some factors that have limited the use of fine mesh screens, including: properties and content of the resin, gel and impurity particle sizes, and flow rate of the resin. Adverse combination of these factors will result in fast agglomeration of particles on the screen surface, fast blinding of the screen filter, catastrophic increase of screen pressure and throughput reduction.

Attempts have been made to filter out gels by intensive mixing. U.S. Pat. No. 4,661,249, for example, suggests filtering out gels by using sintered metal powders and fibers, sand packs, etc. These filters, however, cause high discharge pressure and, consequently, a short filter life. Additionally, it is very difficult to clean such filters as compared with traditional screen filters because the channels in these filters have a complicated shape with "dead zones". It is a problem to remove gels or impurities from these zones even by back melt flow. The problem of "bypassing" for these filters is also very serious due to the high speed of the rise of the discharge pressure.

SUMMARY OF THE INVENTION

The present invention provides a continuous extrusion system for compounding propylene impact copolymers which utilizes packs of screen filters of various meshes to reduce the number and size of gels in the PP copolymers. This reduction results in an improvement in the properties of the resulting copolymer, especially the Gardner Impact strength. This invention provides using a multi-layer, relatively coarse screen filter pack to disperse gels to prevent blinding of the filter openings, to increase throughput of the filter and to preserve the ability of the filters to disperse the polymers well. The screen filter can be applied during the initial manufacture of PP impact copolymers, or in the later processing of the impact copolymers.

DETAILED DESCRIPTION OF THE INVENTION

The process of the present invention includes melting a PP powder which contains at least two polymers, blending the polymers, passing the melted, blended polymers through a filter screen pack, extruding the polymers through a die and then cooling the polymers.

The melting may be accomplished by heaters as are standard in the art or in the blending device. The blending may take place with extruders and processes for extrusion as are described in U.S. Pat. Nos. 4,814,135; 4,857,600; 5,076,988; and 5,153,382. For example, one can use screw extruders, either single or double screw type, e.g., a ZSK co-rotating twin-screw extruder or a Killion single screw extruder. The screw portion of the extruder may be divided up into three sections, the feed section, the compression section, and the metering section, and may have multiple heating zones from the rear heating zone to the front heating zone, the multiple sections and zones running from upstream to downstream. If the extruder has more than one barrel, the barrels should be connected in series. The length to diameter ratio of each barrel is in the range of about 16:1 to about 40:1. The blending can take place at temperatures in the range of about 160 to about 270° C., and preferably is carried out at temperatures in the range of about 180° to about 240° C.

In the case of the mechanical blend of the individual polymers, mixing of the component polymers is accomplished, for example, in a batch type mixer such as a BANBURY™ or a BRABENDER™ mixer. Tangential and intermeshing counter-rotating and intermeshing co-rotating mixers, two stage mixers, and multistage long length/diameter mixers can also be used. Also see the mixing systems in U.S. Pat. Nos. 4,334,783 and 5,458,474.

The blending step is followed by passing the polymers through the multi-screen filter pack, which may be housed in a breaker plate. Every screen filter is characterized by the number of wires per unit of the length in each direction, i.e., mesh. A higher screen mesh, for a given filter, results in a smaller pore size; for example, 325 mesh screen has 42 μm openings. The sum of the meshes of all the individual screens that constitute the filter pack is referred to as the "screen mesh sum" (SMS). It has been found that gel reduction is directly proportional to the SMS of the system through which a copolymer is extruded and that SMS is more important than screen size of the individual filters in the screen pack. Moreover, there are consistent dependencies of SMS and discharge pressure, gel dispersion, or throughput.

The actual SMS for any given system will depend on the system conditions, e.g., throughput, polymer properties, pressure drop, type of extruder, etc. and should be determined experimentally for any given system, though the SMS should be at least about 700, preferably greater than about 900. The selection of the actual combinations of screens for the screen pack depends upon the requirements for dispersion of the components in the final product. It is noted that at least three, and preferably four, screens should be used to achieve this SMS.

Given that the total SMS determines gel reduction, one may avoid the use of fine screens and use coarse screens (i.e., low mesh number), in larger numbers, to achieve gel reduction. Though the individual screens may have openings that are larger than 50 µm, they succeed in reducing a majority of the gels below said size. This allows for the ready commercial use of such screen filter packs since the use of very fine screens is expected to lead to frequent clogging and low mechanical strength (i.e., ripping).

The screens should have openings in the range of about 42 to about 833 µm (i.e., 325 to 20 mesh), the openings of each screen being large enough to essentially avoid capturing the gels, but small enough to break up the gels. As stated previously, the screen openings do not have to be as small as the desired gel size since the screen packs reduce the gels to sizes smaller than the openings in the screen packs. However, it is preferable for the screens to be less than 325 mesh, more preferably less than 250 mesh, to avoid the ripping of the screens, and instead use a larger number of coarse screens. A description of various filter media can be found in Filtration of Plastic Melts, ed. D. Gneuss, publ. Gneuss Kunststofftechnik, Germany, 1988, pages 14 and 15; Filtration of Polymer Melts, publ. VDI-Verlag, Düsseldorf, Germany, 1981, pages 1 to 7; Anderson Wire Works (Houston, Tex.) product data sheet; and Handbook of Chemistry, 10th Edition, 1961, pages 910 to 912.

The screens can be, for example, square weave wire screens and Dutch weave wire screens, one of which is described as an 80 mesh by 700 mesh screen. It is preferred that the screen wire be made in a triangular configuration (so one edge of the triangle cuts the polymer) and woven in a normal mesh pattern.

Multi-screen filter packs with the same SMS can be set up as a uniform block, e.g., 100 mesh×18; multiple blocks, e.g., 100×3+200×3+300×3; or a "sandwich", e.g., 100/200/250/350/350/250/200/100; or multiple "sandwiches", e.g., (100/200/300)×3; and any other combination. However, it has been found that during extrusion, despite the equivalent SMS of such packs, there are benefits with ordering the screens in multiple sandwiches in that, while gel reduction may be equal, throughput is increased, and the pressure drop is decreased.

This preferable screen pack consists of at least two sandwiches of screens ordered in series. The preferred number of screens in each screen sandwich is 3. While more than 3 screens can be used, it is desirable to use as few screens over the number of 3 as possible, but up to 6 screens may provide advantages in some cases. The sandwiches should have at least three screens of varying size, with the largest opening (smallest mesh) screen first in each sandwich and then the other screens introduced into the sandwich in decreasing opening size (increasing mesh size). There should be at least two of each such sandwich ordered in series with the smallest mesh (largest opening) of the second sandwich following the largest mesh (smallest opening) screen of the preceding sandwich. One can use a finer screen in the "sandwich" design than in the "block design" since the finer screens are mechanically supported by being interdispersed among the coarser screens, which prevents them from ripping or tearing. Moreover, it is possible to improve dispersive mixing by using a combination of "sandwiches" and "blocks", alternately, or to add single screens at either end of the screen pack.

The dies that may be used include any of those known in the art, including pelletizers, film dies, blow molds, injections molds, slot casters, etc.

The cooling may be accomplished by allowing the polymer to sit in air, forcing air over the polymer, submerging or spraying the polymer with a liquid, e.g., water, or any other means which is known in the art.

In one embodiment, the system of the present invention can consist of:

(1) a device(s) for melting, mixing, and conveying the PP (e.g., a screw extruder);

(2) a screen changer or screen housing for the screen pack that provides the possibility of placing screens of various number and thickness and which houses a screen pack; and (3) a device for extruding the polymer through a die.

If the throughput is critical, one can include a gear pump in this system and process.

Additionally, a static mixer (a.k.a. a motionless mixer) may be added to improve the gel reduction and distribution during the extrusion process. For example, the static mixer may be added before or after the screen pack. The order of units is selected in accordance with requirements to pressure, throughput, mixing quality, and product quality. Suitable static mixers may be obtained from Koch Engineering Co., Inc. and Chemineer, Inc.

The polymer blend is passed through the screens at a mass flux in the range of about 0.5 to about 15.0 kg/cm$^2$hr, and preferably at a mass flux in the range of about 1 to about 10.0 kg/cm$^2$hr. Generally, only one pass through the screens at the defined mass flux is sufficient to reduce the number of gels of greater than about 200 µm to about 600/m$^2$, usually less than about 500/m$^2$, and most preferably less than 200/m$^2$, and those gels of greater than about 250 µm to less than about 100/m$^2$, and preferably less than about 50/m$^2$. Moreover, gels of greater than 500 µm should be reduced to less than about 50/m$^2$ and more preferably less than about 30/m$^2$. It has been found that at least a major proportion of the gels can be reduced to diameters of less than 50 µm by the process of the invention. Multiple passes through the screen pack can be used, if desired.

The PP blends used in this invention can be any blend of two or more of extrudable propylene homopolymers or copolymers produced from propylene, optionally with one or more comonomers, with impact copolymers being preferred. The comonomers useful in the production of PP can have 2 and 4 to 20 carbon atoms. Examples of these comonomers are alpha-olefins such as ethylene, 1-butene, 1-hexene, 4-methyl-1-pentene, and 1-octene. Particularly preferred are PP impact copolymers, i.e., blends of PP homopolymer with a copolymer of propylene and ethylene, with ethylene at 45–70 weight percent, and with the copolymer phase (i.e., rubber) present at 10–20 weight percent of the total blend.

The PP blends are those containing a plurality of gels having diameters greater than about 100 µm for high melt flow (>20 gm/10 min.) and greater than about 200 µm for low melt flow (<20 gm/10 min.) PP blends, it having been found that gels having diameters less than this do not contribute to the deterioration of the physical properties of PP blends, though the polymers may have meltflows from about 0.1 to 100 g/10 min., and more preferably, from about 20 to 40 g/10 min.

This invention is particularly useful with PP of high melt flow since these are more sensitive to the presence of gels.

In such material, the present invention improves the Gardner Impact strength by at least twenty percent (20%) for low melt flow and at least thirty percent (30%) for high melt flow polymers, as compared to unfiltered polymer.

The PP polymers can be prepared by conventional processes such as the process described in U.S. Pat. No. 4,414,132. Blends of PP can be produced in two or more reactors connected in series wherein a mixture of PP and active catalyst is transferred, for example, from the first reactor to the second reactor in which another PP is prepared and blends in situ with the polymer from the first reactor. The reactors can be independent reactors or stages within one reactor. The blend can also be a mixture of separately produced PPs mixed together by dry or melt blending.

The in situ blend is preferably produced with Ziegler-Natta catalysts which contain a procatalyst made from an internal electron donor, a titanium source, a magnesium source and a halogenating agent (which may be combined with one of the other components), which procatalyst is combined with a cocatalyst (typically an aluminum alkyl) and optionally, an external selectivity control agent ("SCA"). See, e.g., U.S. Pat. Nos. 4,393,182 and 5,106,806. Additionally, the use of metallocene procatalysts, which are activated with borane or alumoxanes are known in gas phase reactors for polymerizing the production of PP. See, e.g., U.S. Pat. Nos. 5,455,366; 5,329,033; and 5,145,819. Other useful catalyst systems are a vanadium based catalyst system, see U.S. Pat. No. 4,508,842, a chromium based catalyst system, see U.S. Pat. No. 4,101,445, and catalyst systems which use chromium or molybdenum oxides on silica-alumina supports.

In those cases where it is desired to support the procatalyst, suitable supports include inorganic oxides such as aluminum phosphate, silica, alumina, silica/alumina mixtures, and silica modified with reagents capable of reacting with surface silanols. Alternatively, the procatalyst can be used in slurry form or can be obtained by spray drying.

In a typical in situ process, the entire catalyst system, which includes the procatalyst and the cocatalyst or a preactivated or prepolymerized catalyst, is added to the first reactor. The catalyst is embedded in the polymer produced in the first reactor, and this polymer composition is transferred to the second reactor. Additional procatalyst, cocatalyst or external selectivity control agent may be added to the second reactor as necessary. Preferably PP homopolymer is made in the first reactor and EPR is made in the second reactor. The in situ blend conditions are similar to the conditions used to produce PP in a single reactor. A fluidized bed reactor and a fluidized bed polymerization procedure are exemplified in U.S. Pat. Nos. 4,482,687 and 4,302,565.

The polymers (single or blend) are generally extruded into pellets for later processing according to the present process or fed as a powder directly into a system of the present invention. The polymers can also be injection molded, blow molded, slot casted, film casted and the like instead of pelletizing. The present invention can be used in these downstream applications, not just in the manufacture of PP impact copolymers.

Conventional additives, which can be introduced into the PP blend during extrusion, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the total additive content can be present in the blend in amounts about 0.1 to about 1.0 weight percent, with individual additives present at between 200 and 3000 ppm (i.e., 0.02 to 0.30% by weight) each. Fillers can be added in amounts up to 10 parts by weight of the polymer blend.

EXAMPLES

Example 1

Comparative testing was carried out using a granular (i.e., also called powder or flake) PP impact copolymer which had been made in a two-reactor continuous process. The copolymer was 4.5 melt flow (g/10 min.; ASTM D1238; 2.16 kg, 230° C.), had 17% wt rubber content, and was known to contain a number of large rubber gels if extruded without screens on an extruder which was not designed for intensive mixing.

This copolymer was extruded through a ¾" (i.e., 1.9 cm) diameter single screw extruder fitted with a film casting die. Screens could be placed on the breaker plate of the extruder; the breaker plate was located just in front of the die. Film was cast onto a conveyer belt, which carried the film to a cooling device. The film was weighed on a balance to determine throughput per unit time. Evaluation of gel number and size was performed visually.

This experiment was designed to demonstrate the opportunity to increase the reliability of the screen filter by using more layers of low mesh strong screens in place of fewer numbers of layers of thin high mesh screens.

TABLE 1

|  | Run 1 | Run 2 | Run 3 |
|---|---|---|---|
| Screen filter | None | 40 mesh × 30 | 80 mesh × 15 |
| Pressure Drop (MPa) | .93 | 7.3 | 7.5 |
| Throughput (kg/hr) | 1.58 | 1.26 | 1.25 |
| Flux (gm/hr cm$^2$) | 556 | 442 | 438 |

The data shows that Runs 2 and 3 which contain screens with an equal SMS (40×30=1200, 80×15=1200), but with different types and number of screens. Regardless of these differences between Runs 2 and 3, the pressure, throughput, and resulting gel dispersion were equal. The films made in Runs 2 and 3 had fewer gels than that made in Run 1, though not quantified. The life of the screen pack in Run 2 is expected to be longer than the life of the high mesh screen filter (Run 3) due to the larger openings and coarser, stronger wires used in the pack of Run 2. Thus, one can achieve gel reduction with both systems, but improved life by using coarser screens.

Example 2

Comparative testing was carried out using the copolymer and extruded as above, except a comparison was made of screen filters which were designed as a "block" type and "sandwich" type. The "block" is made from blocks of screens, each block using one screen size, with every block having a different screen size. The "sandwich" screen pack was made from several groups of packs, each group the same, and each group containing different screen sizes.

Gel counting was performed visually. Evaluation of gels was done on the eight-class scale; the higher the number, the smaller and fewer the gels. The purpose of this experiment was to demonstrate how to control the mixing process by varying the positions of screens, which use an identical screen type and number.

TABLE 2

|  | Sample 1 | Sample 2 (Block) | Sample 3 (Sandwich) |
|---|---|---|---|
| Screen filter | No screen | (40 × 3)/(80 × 3) (200 × 3)/20 | (40/80/200) × 3/20 |
| Pressure Drop (MPa) | .67 | 5.8 | 5.2 |
| Throughput (kg/hr) | 1.57 | 1.32 | 1.36 |
| Class of gel dispersion | 4 | 7 | 7 |
| Flux Rate (g/hr cm$^2$) | 552 | 463 | 476 |

Run 3 had a lower pressure drop, at a somewhat higher throughput rate, than Run 2 did. This indicated a benefit using a "sandwich" type of pack, rather than the "block" type of configuration. The gel dispersion was equivalent from Run 2 to Run 3 with screen packs of equal SMS. The comparison of Run 1 to Runs 2 and 3 indicate the benefits of the present invention in reducing gels.

Example 3

Comparative testing of screen packs was carried out in the laboratory using pellets of impact copolymer that had been made on a Werner & Pfleiderer ZSK-300 (i.e., a 300 mm co-rotating twin screw extruder) which had a high intensity mixing section. The copolymer pellets were 2.3 melt flow (g/10 min.; ASTM D1238; 2.16 kg, 230° C.), had 20% wt rubber content, and were known to contain a number of large rubber gels if later extruded without screens on an extruder which was not designed for intensive mixing.

In the laboratory comparison, this copolymer was extruded through a 1.5" (i.e., 3.81 cm) diameter single screw extruder fitted with different screen packs; the melt extrudate was put through a water bath, then cut into pellets. The pellets were then extruded into film through the ¾" (i.e., 1.9 cm) diameter single screw extruder described in Example 1; no screens were used in the ¾" extruder when the pellets were extruded into film. Gel content measurements on the film were done using a Film Quality Analyzer (i.e., FQA) camera system.

The FQA is a commercially available opto-electronic measuring system used in determining film purity. It consists of a high-resolution ccd line scanning camera that can detect particles 25 μm and larger. A flat film passes over a light source which is measured by a ccd line camera to determine the variation of transmitance horizontally across the surface of the film. Gels, particles and the film defects can be measured for size, counted and sorted into groups of sizes using this system. The faults in each size group are reported as counts/m$^2$.

Gardner Impact strength (GI) was determined (like the rest of the examples below) at −30° C. on injection molded plaques and is reported in Joules.

TABLE 3

| Run | Screen Pack Design | Pressure Drop (MPa) | Through put (kg/hr) | Gel Dispersion (#/m$^2$) 100–251 μm | 251–500 μm | GI |
|---|---|---|---|---|---|---|
| 1 | None | 5.6 | 19.1 | 650 | 50 | 27.4 |
| 2 | 20/100/200/ 325/20 | 8.10 | 16.2 | 601 | 47 | 34.1 |

TABLE 3-continued

| Run | Screen Pack Design | Pressure Drop (MPa) | Through put (kg/hr) | Gel Dispersion (#/m$^2$) 100–251 μm | 251–500 μm | GI |
|---|---|---|---|---|---|---|
| 3 | 20/(100/200/ 325) × 3/20 | 11.7 | 15.0 | 526 | 37 | >36.2 |
| 4 | 20/(100/200/ 325) × 5/20 | 14.8 | 13.6 | 444 | 32 | 33.8 |
| 5 | 20/(100/200/ 325) × 10/20 | 21.7 | 10.9 | 316 | 24 | >36.2 |

This set of data demonstrates the efficacy of sandwich filter packs in improving product performance. Gel dispersion was significantly improved and therefore, the impact strength of the PP copolymer improved.

Example 4

Comparative testing of the dispersive efficiency of a multilayer screen pack and a fine screen pack was conducted on the same ¾" extruder described in Example 1. In this case, however, gel measurements on the films were not done visually but instead used the FQA camera described in Example 3. The PP copolymer used was an impact copolymer of 2 gm/10 min. melt flow and 20% wt. Fc (rubber content of the polymer).

The fine screens used were 80×700 Dutch Weave, each such screen having an equivalent SMS of 400.

TABLE 4

| Run | Screen Design | Pressure Drop (MPa) | Gel Dispersion (#/m$^2$) 100–251 μm | 251–500 μm | SMS |
|---|---|---|---|---|---|
| 1 | 100/325 × 4/20 | 8.7 | 1169 | 104 | 1420 |
| 2 | 80/(Dutch Weave 80 × 700) × 2/20 | 11.7 | 1283 | 126 | 900 |

These data demonstrate a significant difference between a multi-layer screen pack and a fine screen pack. The SMS of Run 1 was higher, but the pressure for Run 1 was 34% lower than those for Run 2. At the same time the dispersion of large gels in Run 1 was better by 10–20% as compared to Run 2. This means that for gel dispersion, surprisingly, the coarse multi-layer screen pack is significantly more effective than a fine screen pack.

Example 5

Comparative testing was carried out using several granular PP impact copolymers which had been made in a two-reactor continuous process, which were known to contain a number of large rubber gels when extruded without screens on extruders which were not designed for intensive mixing. Additives were mixed into the powders prior to extrusion as follows: 1000 ppm Irganox® 1010 additive, 1000 ppm Irgafos® 168 additive and 700 ppm Ca stearate. The copolymer compositions had the following properties:

TABLE 5

| Copolymer Powder | A | B | D |
|---|---|---|---|
| Melt Flow (g/10 min.; ASTM D1238; 2.16 kg, 230° C.) | 4 | 5 | 8 |
| Fc (rubber content of the polymer, in % wt) | 14 | 18 | 15 |
| Ec (ethylene content of the rubber, in % wt) | 57 | 55 | 57 |

The powders were extruded through a 1.5" (i.e., 3.8 cm) diameter single screw extruder, under nitrogen, into a water bath and chopped into pellets. Various screen combinations were placed on the breaker plate of the extruder. The screen packs were either 20/40 (Type A) [comparative] or 20/40/120/325×3/40 (Type B). The breaker plate was located just in front of the die. Some of the resulting pellets were then put through a ¾" (i.e., 1.9 cm) diameter extruder and the melt was cast into film. A relative comparison of film gel content was done visually. Pellets were also injection molded using ASTM conditions and physical properties were measured on the molded parts. Notched Izod impact (NI) was measured at 23° C. and is reported in J/m. Gardner impact (GI) was measured at −30° C. and reported in Joules. The 1% secant flexural modulus (1% Sec.) was measured at 23° C. and 0.05'/min and is reported in MPa. The results are listed in Table 6.

The purpose of this experiment was to demonstrate the use of multiple screens in reducing gel content and to also show which physical properties were sensitive to gel content.

TABLE 6

| Run | Co-polymer | Pack Type | Through-put (kg/hr) | GI | NI | 1% Sec. |
|---|---|---|---|---|---|---|
| 1 | A | A | 18.7 | 14 | 93 | 1340 |
| 2 | A | B | 18.0 | 15 | 90 | 1340 |
| 3 | D | A | 12.1 | 2 | 77 | 1230 |
| 4 | D | B | 11.7 | 8 | 84 | 1240 |
| 5 | B | A | 12.2 | 3 | 102 | 1250 |
| 6 | B | A | 29.5 | 3 | 116 | 1240 |
| 7 | B | B | 11.2 | 14 | 110 | 1240 |
| 8 | B | B | 25.9 | 15 | 113 | 1240 |

In a visual examination of films, the gel content was not affected by the throughput rates used; gel content decreased when the multiple screens were used. The physical property data show that properties depended on the copolymer powder used. For a given powder, notched Izod impact and flexural modulus were not affected by the use of multiple screens, while Gardner impact could be affected by the use of such screens. An improvement in Gardner impact was seen for powders B and D; this improvement occurred when the multiple screens were used resulting in a reduction of gel content. For powder A, the use of multiple screens reduced gel content, but did not significantly improve Gardner impact. This was taken to mean that the original gel content of powder A was not high enough to reduce the Gardner impact strength.

Example 6

Several samples of PP impact copolymer powders per Example 5, except with properties and additives noted in Table 7 below, were extruded as per Example 5, but with different screen packs as noted in Table 8. The physical properties of injection molded parts are reported as in Example 5.

The purpose of this experiment was to demonstrate the use of multiple screens in reducing gels for both high and lower melt flow impact copolymers, and also to demonstrate the effects of nucleating agent, sodium benzoate.

TABLE 7

| | PP Powder Properties | | | | | |
|---|---|---|---|---|---|---|
| Formulation # | 1 | 2 | 3 | 4 | 5 | 6 |
| PP Lot # | A* | B* | A* | B* | C | C |
| Ec | 57 | 55 | 57 | 55 | 57 | 57 |
| Fc | 14 | 18 | 14 | 18 | 15 | 15 |
| MF | 4 | 5 | 4 | 5 | 37 | 37 |
| Irganox ® 1010 | 1000 | 1000 | 1000 | 1000 | 750 | 1000 |
| Irgafos ® 168 | 1000 | 1000 | 1000 | 1000 | — | — |
| P-EPQ | — | — | — | — | 750 | 1000 |
| Hydrotalcite DHT-4A | — | — | 400 | 400 | 250 | 400 |
| Ca Stearate | 700 | 700 | — | — | — | 700 |
| Na Benzoate | — | — | 600 | 600 | 500 | — |
| Acrawax C | — | — | — | — | 500 | — |

*Same as Copolymer Powders of Table 5 and Formulations 1 and 2 correspond to A and B of Example 5.

| PP Lot # | Screens | GI | NI |
|---|---|---|---|
| 1 | 20/40/120/325 × 3/40 | 14 | 84 |
| 2 | 20/40/120/325 × 3/40 | 14 | 84 |
| 3 | 20/40/120/325 × 3/40 | 13 | 112 |
| 4 | 20/40/120/40 | 3 | 114 |
| 4 | 20/40/120/325/40 | 10 | 109 |
| 4 | 20/40/120/325 × 3/40 | 9 | 109 |
| 4 | 20/40/120 × 4/40 | 9 | 113 |
| 4 | 20/40/(120/325) × 3/40 | 13 | 109 |
| 4 | 20/40/120/325 × 3/120 × 2/40 | 15 | 111 |
| 5 | 20/40/120/325 × 3/40 | 2 | 46 |
| 5 | 20/40/120/400/325 × 2/40 | 2 | 45 |
| 5 | 20/40/120/325 × 2/400/40 | 2 | 49 |
| 6 | no screens | 2 | 50 |

In a visual examination of films, gel content decreased when multiple screens were used. The physical property data showed that, as in Example 5 the physical properties depended on which copolymer powder was used, and for a given powder the notched Izod impact was not affected by the use of multiple screens. Gardner impact was improved using multiple screens for powder B, but not for powder C. Powder C give very poor Gardner impact; the use of multiple screens reduced gels, but not to a point where the Gardner impact strength was improved. This is interpreted to mean that different copolymers can need differing levels of SMS screens to reduce gels to the level where gels do not affect Gardner impact.

The use of sodium benzoate did not affect the Gardner impact for samples made from powder A. For powder B, comparing samples made with and without sodium benzoate and extruded using the same screen configuration, GI was 13 J for the non-nucleated sample and 9 J for the nucleated sample. This is interpreted to mean that the use of sodium benzoate gives a more brittle system, which is more sensitive to the presence of gels. The use of additional screens reduced gels and increased GI back to values of 13 & 15 J.

Example 7

For this example, an impact copolymer was used that had MF=2 dg/min, Fc=24, Ec=60 and β/α=2.

$$\left[\frac{\beta}{\alpha} = \frac{100}{Fc}\left[\left(\frac{MF\ homo}{MFCopoly}\right)^{.213} - 1\right] + 1\right].$$

screens used and number of screens were extruded on a Killion single-screw extruder (extruder screw diameter of ¾ in (1.92 cm); L/D is 20:1). The screen configuration and corresponding film gel rankings (best=1; worst=6) are given in Table 8. On examination, the film ranked 1 was essentially gel free with the unaided eye; that ranked 2 had very fine gels; that ranked 3 had a moderate level of gels; that ranked 4 was judged moderately high in gel content with directionally larger gels; and that ranked five had both a high gel content and larger gels. It was clear from this qualitative comparison that certain screens and combinations thereof were more effective than others. Extruder throughputs differed over the course of the samples, although no differences were seen between Runs 3 through 5 where it is also seen that changing the screen configurations affected gel levels. Thus it is concluded that the relatively small changes in extruder throughput over all experiments were inconsequential in regard to the levels of gels seen.

Table 8 also includes mechanical properties for the above materials as developed from injection molding using a reciprocating screw. The GI, NI, and 1% Sec are all as above.

It is evident from the findings for Runs 1 through 5 that the screen configurations of the present invention, i.e., runs 3, 4 and 5, reduced gels significantly, and also were associated with the best GI values. The screen configurations of the invention allow the production of impact copolymers at high β/α (values of 2 or higher) that in turn is known to favor higher notched Izod impact strength and good weld line strength. Without effective screening, there would be a concurrent loss in GI strength with such high β/α.

TABLE 9

| Run | 1 | 2 | 3 | 4 | 5 |
|---|---|---|---|---|---|
| Gel Rank | 5 | 4 | 3 | 2 | 1 |
| Screen | 40/100 | 40/250 | 40/400 | 40/100/ 250/325/ 400/40 | 40/250/ 325/400/ 400/40 |
| NI | 147.86 | 126.51 | 151.07 | 143.59 | 146.80 |
| GI | 13.33 | 14.01 | 15.59 | 15.37 | 15.37 |
| 1% Sec | 1136.99 | 1138.36 | 1116.30 | 1136.30 | 1136.99 |
| Ten. Yld. St., 2 in/min, psi | 3,370 | 3,430 | 3,374 | 3,368 | 3,330 |
| Ten. Yld. El., % | 5.80 | 5.69 | 5.67 | 5.50 | 5.38 |
| Ten. Brk. St., 2 in/min, psi | 2,832 | 2,629 | 2,610 | 2,807 | 2,791 |

TABLE 9-continued

| Run | 1 | 2 | 3 | 4 | 5 |
|---|---|---|---|---|---|
| Ten. Brk. El., % | 202 | 185 | 227 | 323 | 180 |
| Throughput | 4.5 | 4.5 | 4.2 | 4.3 | 4.1 |

We claim:

1. A method for decreasing the amount of polymeric gels in polypropylene blends comprising at least two polypropylene polymers comprising passing the blend through a plurality of screen filters of 44 to 900 μm to reduce the number and size of gels in the polypropylene blend.

2. A method according to claim 1 comprising:

(a) melting the polypropylene blend;

(b) blending the polypropylene blend;

(c) passing the polypropylene blend through a plurality of screen filters as per claim 1;

(d) extruding the polypropylene blend through a die; and (e) cooling the polypropylene blend.

3. A method according to claim 2 wherein the number of gels of greater than 200 μm in the polypropylene blend is reduced to less than about 600 per square meter.

4. A method according to claim 3 wherein the propylene blend is an impact copolymer.

5. A method according to claim 2 wherein the number of gels of greater than 250 μm is reduced to less than 100 per square meter.

6. A method according to claim 5 wherein the copolymer has a melt flow of 0.1 to 100 g/10 min.

7. A method according to claim 6 wherein the copolymer has a melt flow of 20 to 40 g/10 min.

8. A method according to claim 6 wherein the Gardner Impact strength of the copolymer is increased by the process by at least twenty percent.

9. A method according to claim 2 additionally comprising a step of mixing the polypropylene blend in a static mixer.

10. A method according to claim 1 which uses at least two sandwiches of filters, each sandwich comprising at least three filters.

11. A method according to claim 2 wherein the extrusion is conducted in either a single or a twin screw extruder.

12. A method according to claim 1 wherein the polypropylene blend is passed through the filters at a rate of about 0.5 to about 15 kg/cm² hr.

13. A method according to claim 1 wherein the screen mesh sum of the screen filters is at least about 700.

14. A method according to claim 1 wherein the screens have triangular shaped wire and are woven into a mesh.

* * * * *